Dec. 22, 1936.   R. N. MILLER   2,065,285
SUPPLY AND CONTROL SYSTEM FOR BOILERS AND THEIR FURNACES
Filed July 25, 1933    9 Sheets-Sheet 4
FIG_IV.
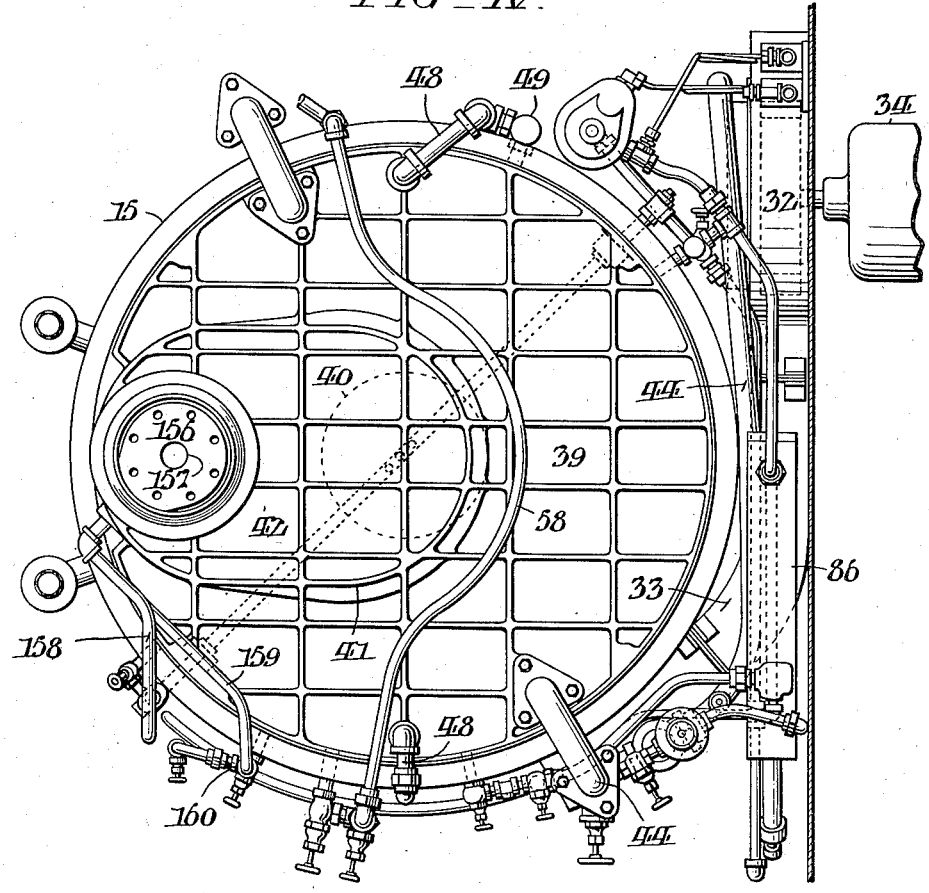
WITNESSES:
INVENTOR:
Robert N. Miller,
BY
ATTORNEYS.

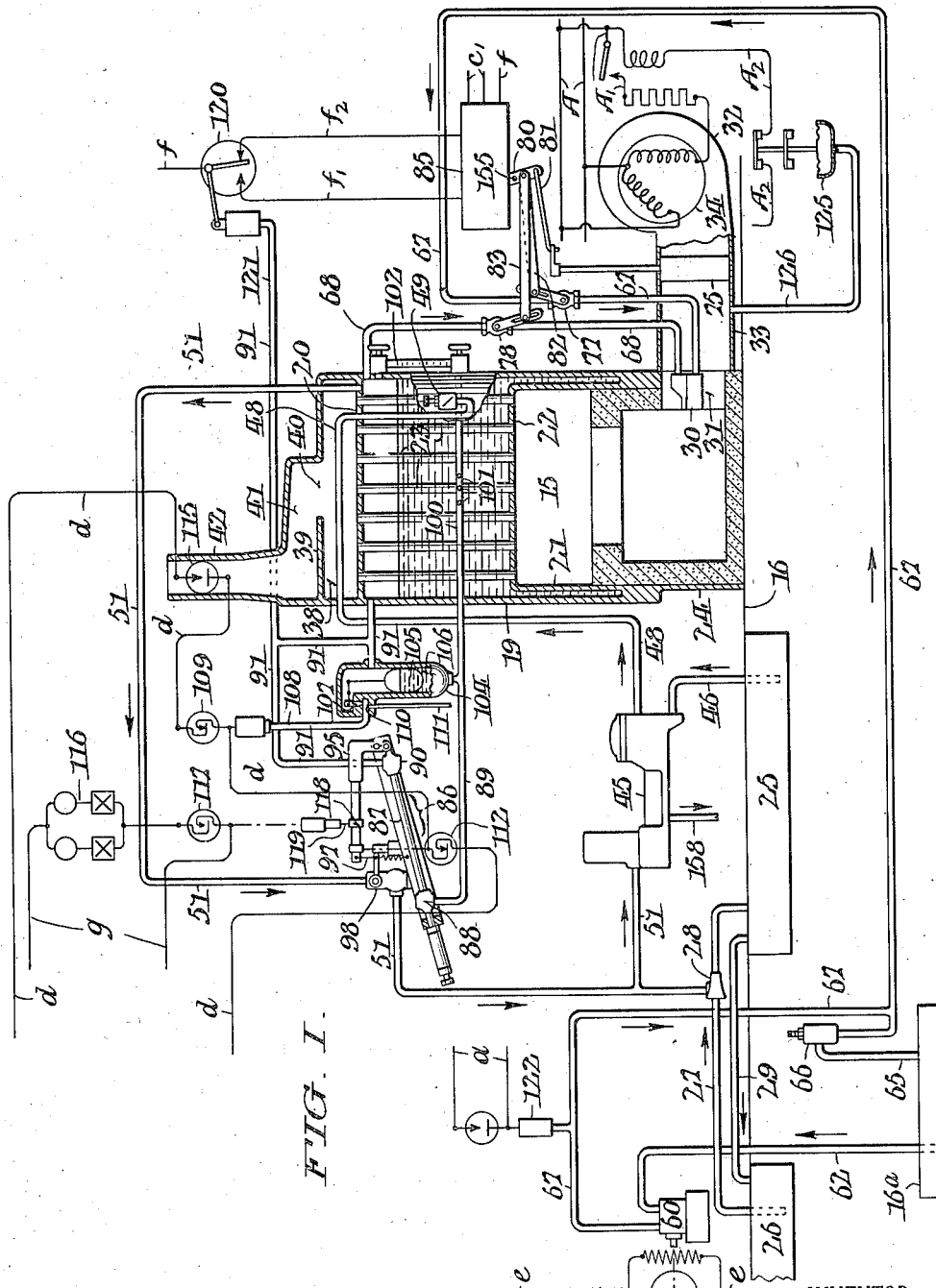

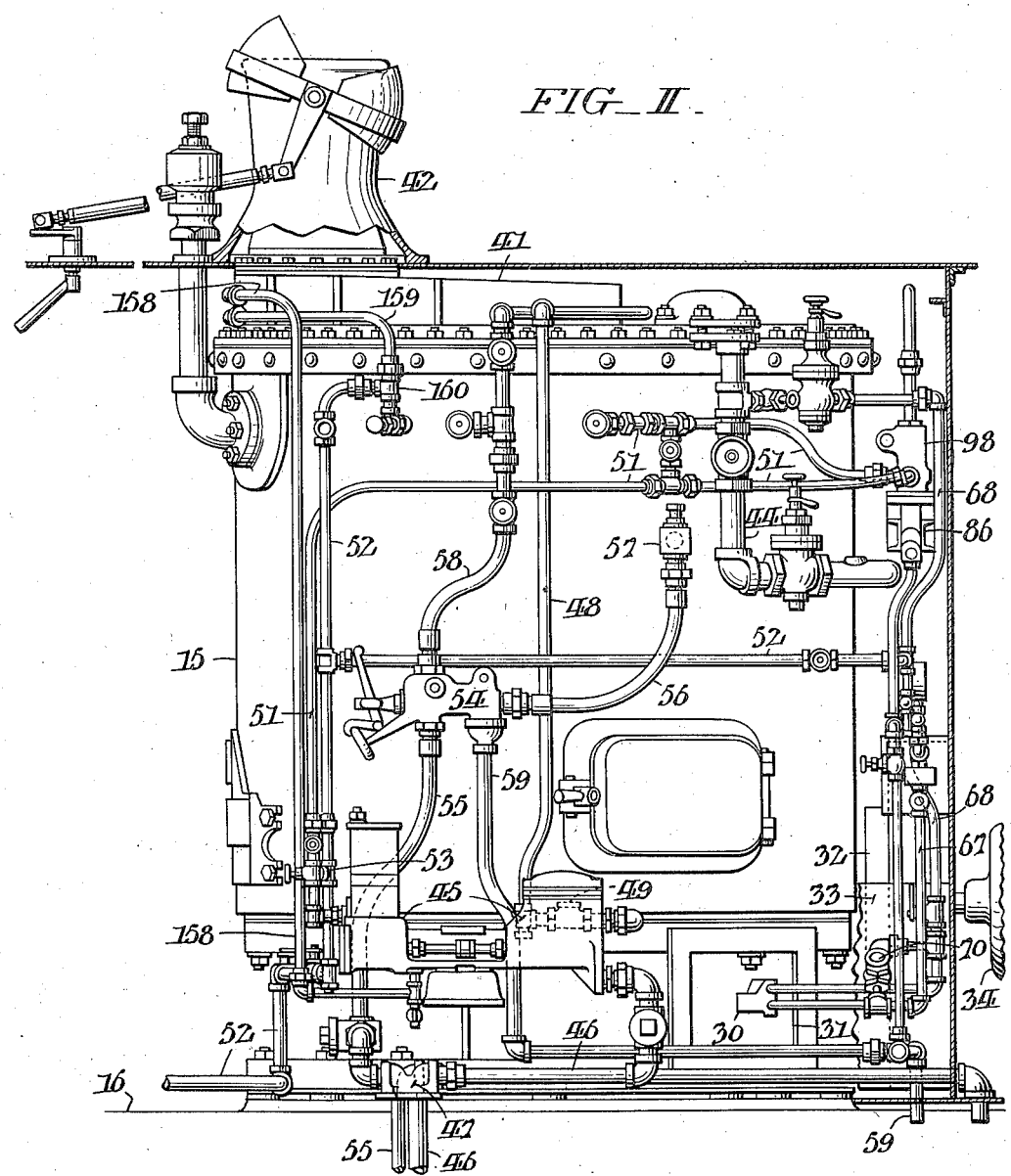

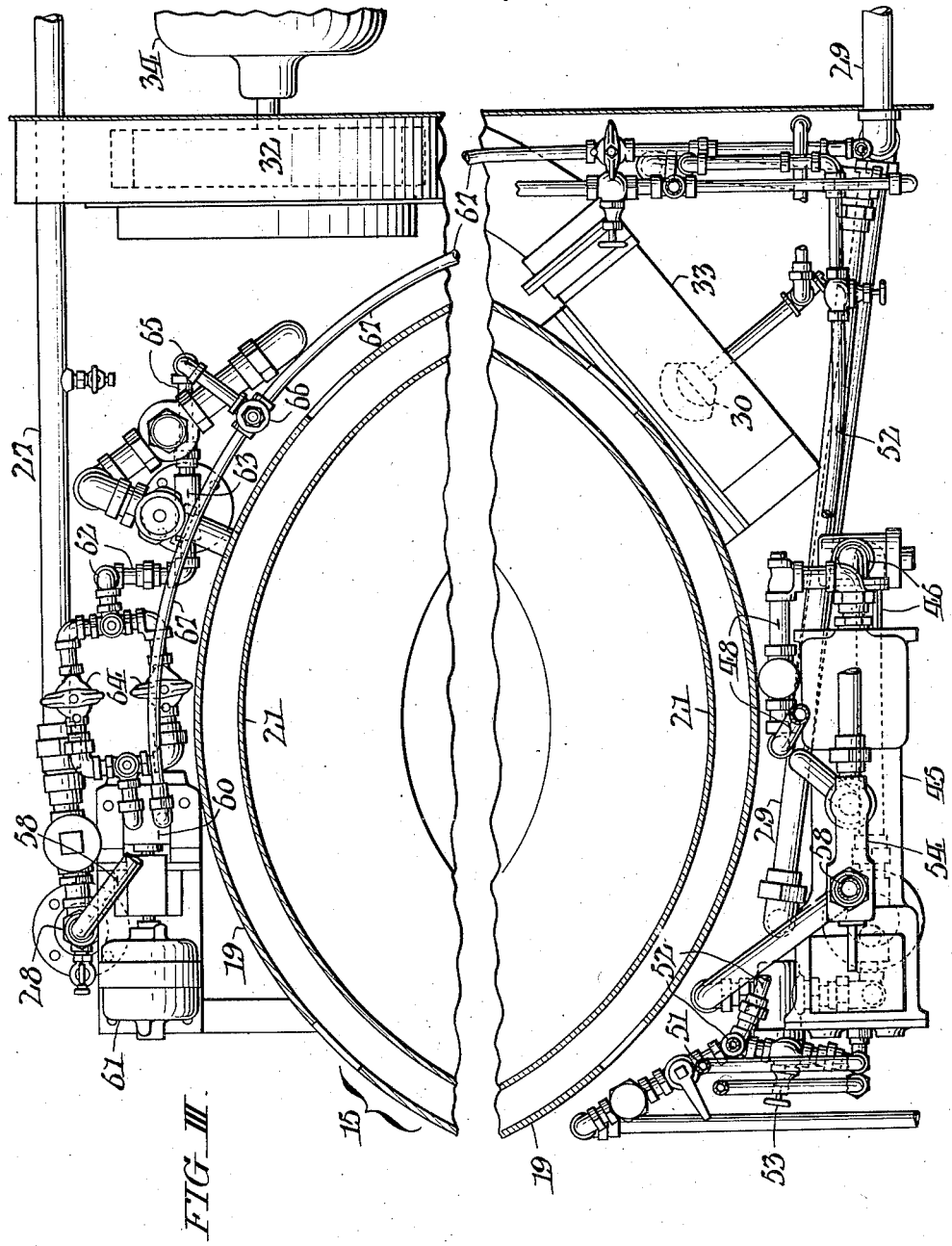

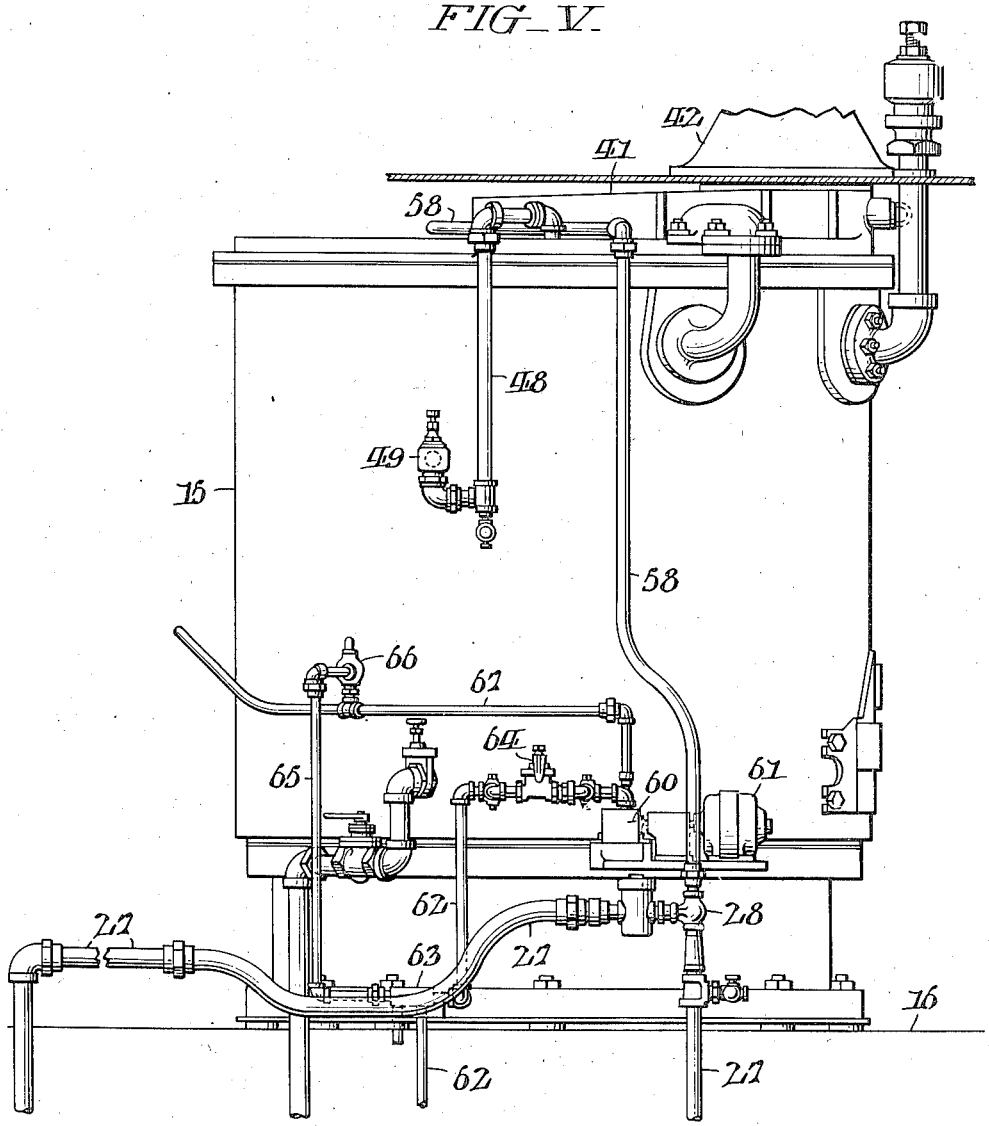
FIG_V

Dec. 22, 1936.  R. N. MILLER  2,065,285
SUPPLY AND CONTROL SYSTEM FOR BOILERS AND THEIR FURNACES
Filed July 25, 1933    9 Sheets-Sheet 6
FIG. VI.
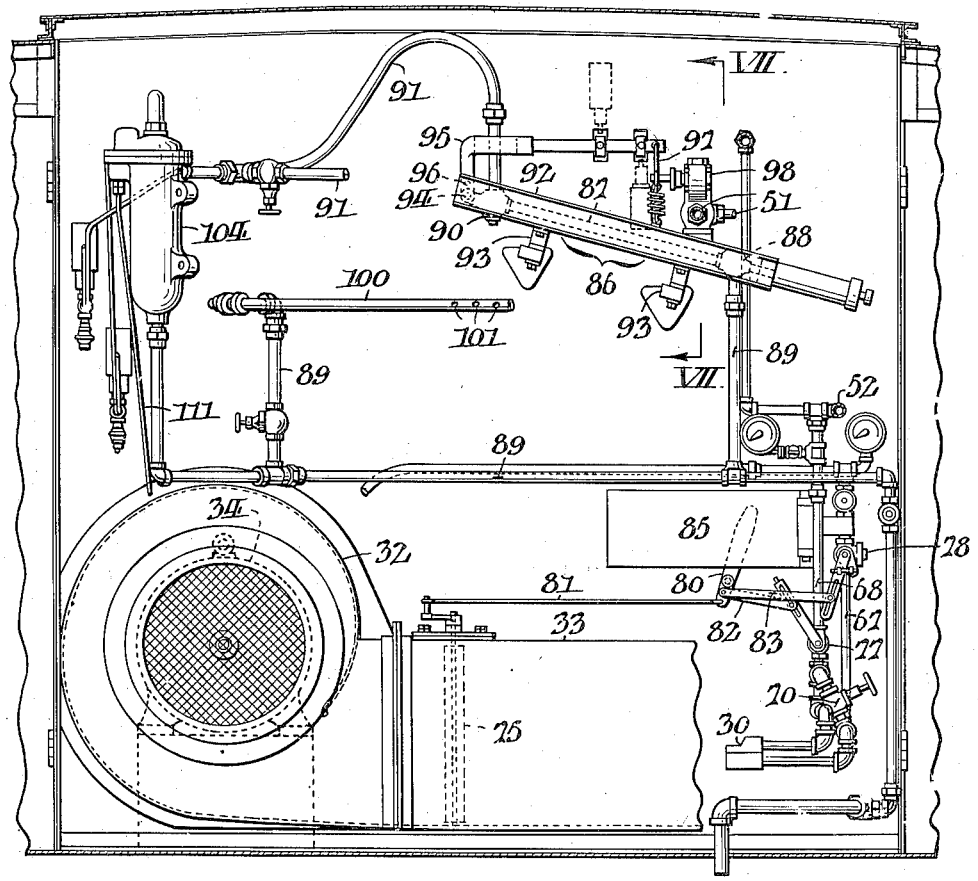
WITNESSES:
John A. Weidler
William Bell, Jr.
INVENTOR:
Robert N. Miller,
BY Frailey Paul
ATTORNEYS.

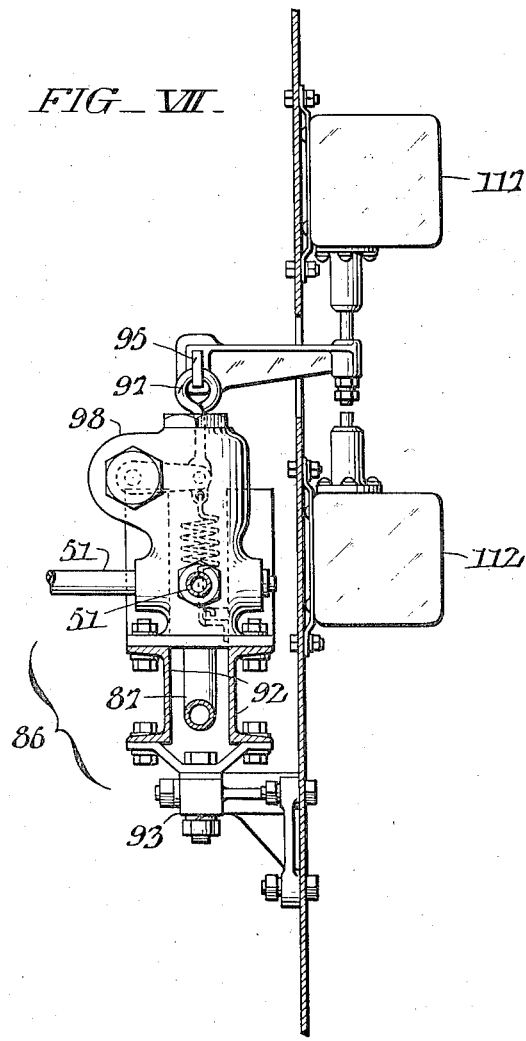

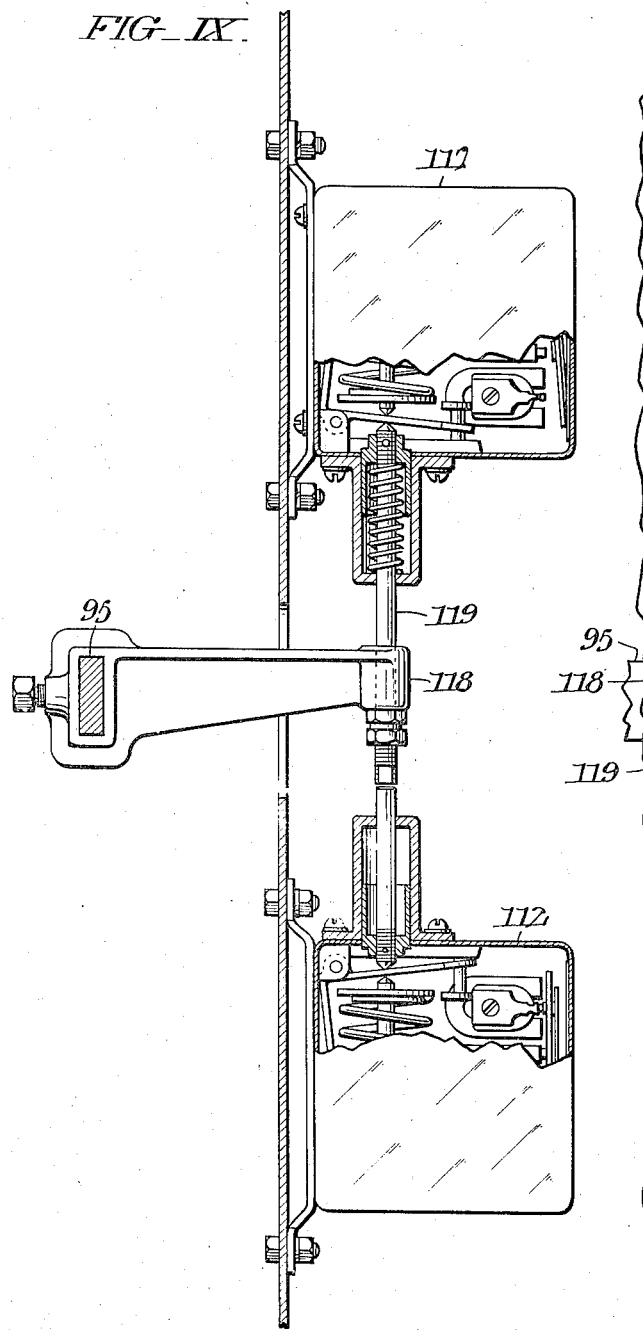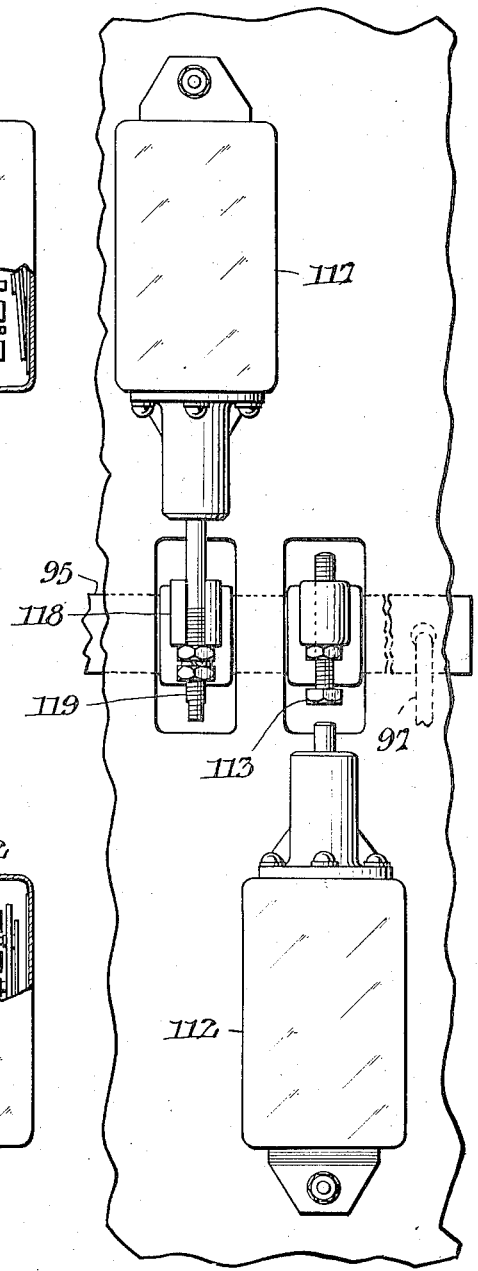

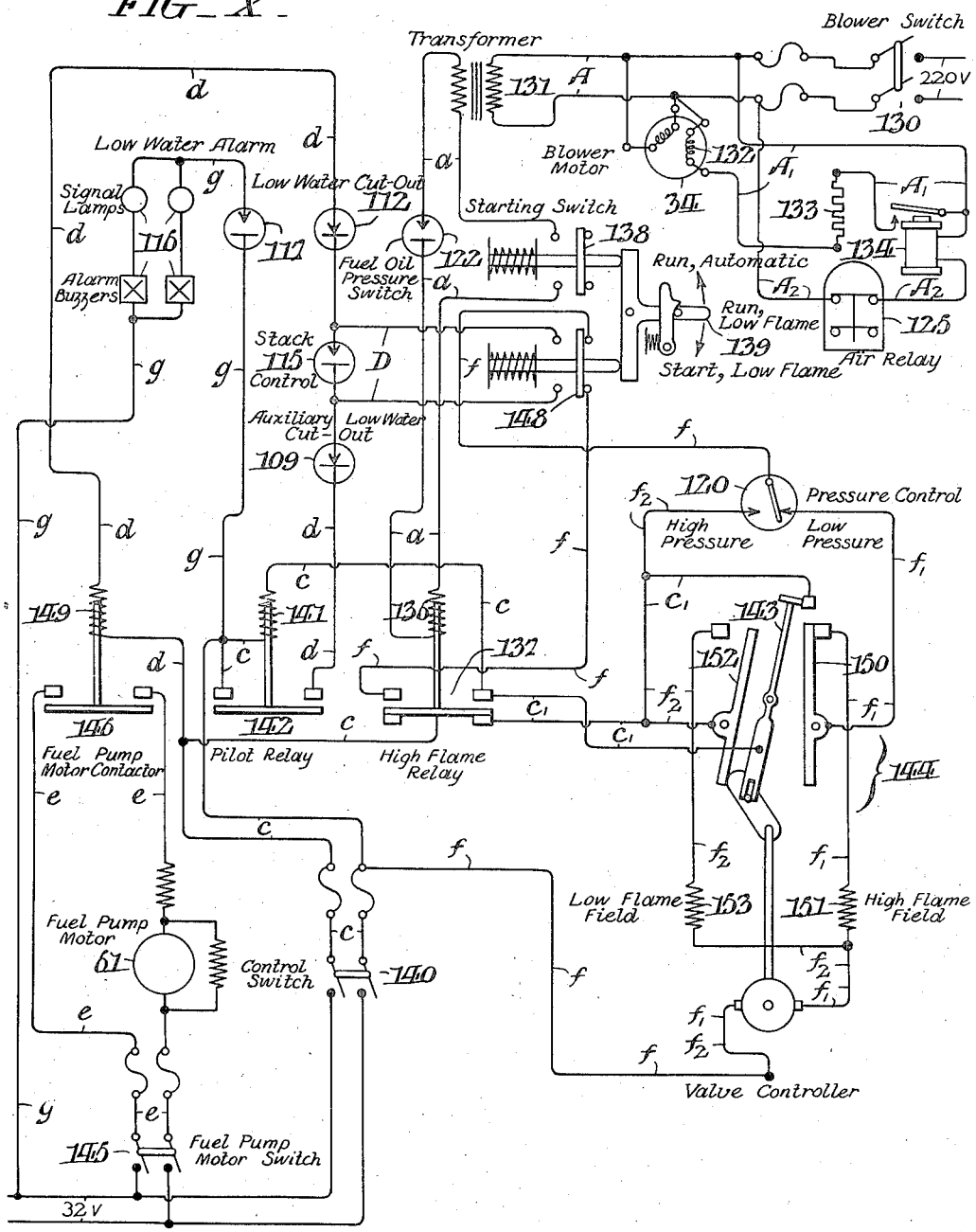

Patented Dec. 22, 1936

2,065,285

UNITED STATES PATENT OFFICE 2,065,285

SUPPLY AND CONTROL SYSTEM FOR BOILERS AND THEIR FURNACES

Robert N. Miller, Altoona, Pa.

Application July 25, 1933, Serial No. 682,079

16 Claims. (Cl. 122—448)

This invention relates to supply and control systems for boilers and their furnaces, and is hereinafter explained and described with reference to a boiler intended especially to supply steam for heating ordinary railway cars, such as day coaches, Pullmans, baggage, postal, or express cars,—as when they are drawn by locomotives operated by power other than steam.

Standard passenger cars of steam railroads are equipped for steam heating, so that when they are drawn by locomotives operated by power other than steam, special provision must be made for supplying steam to heat the cars. The operation of a special boiler on a railway vehicle (as a locomotive) involves peculiar conditions which the present invention is particularly adapted to meet. Various other features and advantages that can be realized through the invention will appear from the description hereinafter of an illustrative and presently preferred form of embodiment. So far as novel over the art, all the features here shown or described are my invention.

In the drawings, Fig. I is a diagrammatic general view of a steam boiler with supply and control system or equipment conveniently embodying the invention.

Fig. II is a side view of the boiler and associated parts and equipment.

Fig. III is a fragmentary plan view, partly in horizontal section, on a larger scale than Fig. II, with a mid portion of the boiler and associated parts broken out and omitted.

Fig. IV is a plan view of the boiler and associated parts, corresponding to Fig. II, but with the water and fuel feed pumps omitted.

Fig. V is a side view of the boiler and associated parts, with the smokestack mostly broken away, showing the side opposite that shown in Fig. II.

Fig. VI is a view from the left of Fig. IV with the boiler itself and various parts removed, showing especially the regulating equipment between the boiler and the adjacent transverse partition or bulkhead in the locomotive cab,—this partition appearing in section at the right of Figs. II, III and IV.

Fig. VII shows a transverse section through a feed water regulator and associated parts, taken as indicated by the line and arrows VII—VII in Fig. VI.

Fig. VIII is a fragmentary view of certain electric switches of the control system operated by the regulator of Fig. VII, the view being taken at right angles to Fig. VII, and on a larger scale.

Fig. IX is a fragmentary view of the same switches, similar to that afforded by Fig. VII but on a larger scale, with certain parts in vertical section.

Fig. X is a wiring diagram of the electrical accessories of the system and their connections, and of the control circuits for the system.

The boiler 15 here shown (see Figs. I, II and IV) is adapted to be installed on an electric locomotive as described in my co-pending application Serial No. 655,909, filed February 9, 1933,—the frame of such locomotive being illustrated in U. S. Patent No. 1,828,418, granted October 20, 1931, to W. F. Kiesel, Jr. As set forth in my said application, the boiler 15 may be mounted in the locomotive cab (not shown) over water and fuel supply reservoirs in the locomotive frame (not shown), under the cab floor 16. (Fig. I.) Though a suitable water tube boiler might be used, the particular boiler 15 here shown is of vertical fire tube type (Fig. I), comprising outer shell 19 with upper tubesheet 20, inner shell 21 with lower tubesheet 22, and fire tubes 23 extending between the tubesheets 20 and 22. The lower end of the boiler 15 rests on the furnace firepot 24. In the ends of the locomotive frame (not shown) are feedwater spaces or reservoirs 25, 26 connected by a siphon pipe line 27 through which water is transferred from reservoir 26 to reservoir 25 (which is the primary, direct source of supply for the boiler) by a steam siphon 28. Any excess of water thus transferred to reservoir 25 overflows and returns to reservoir 26 through a pipe line connection 29. The boiler 15 is fired by an oil burner 30 mounted at a firepot opening 31 (Figs. I, II and III). Air for combustion is supplied by a centrifugal blower 32 through a valve or damper-controlled duct or trunk 33 that normally covers over the opening 31 and encloses the burner 30,— the blower 32 being driven by a (constant speed) electric motor 34. The products of combustion rise from the firepot 24 through the combustion space within the shell 21 and through the firetubes 23 into a vertically shallow smoke box 38 (Figs. I, II, IV and V) within the shell 19 above tubesheet 20, closed on top by a cover 39, whence they make exit through a central opening 40 into a shallow breeching 41. In the breeching 41, the gases pass forward to a stack 42 offset forward of the opening 40. In the smoke box 38 may be a feedwater heater and a steam superheater (not shown). Steam from the boiler dry pipe (not shown) passes through valved pipe connections 44 (Fig. II) that include the superheater (not shown) to the train-pipe (not shown) for car heating steam.

The boiler 15 receives water (Figs. I, II, III and V) from a duplex steam driven direct-acting feed pump 45 which draws from supply reservoir 25 through a valve and strainer-equipped pipe connection 46 and a triple fitting 47 in the top reservoir wall. The feed pump 45 delivers into the boiler 15 through pipe connections 48 that include the smoke-box feedwater heater (not shown), as well as a check valve 49. (See also Fig. V.) The feed pump 45 takes boiler steam (Figs. I, II and III) through suitably valved and controlled pipe connections 51, to which on occasion compressed air can be supplied from a pipe 52 through a valved connection 53, in order to operate the pump before getting up steam. There is also shown (Fig. II) an emergency injector 54 that draws water from the supply reservoir 25 through pipe connections 55 including the fitting 47, and delivers to the boiler 15 through a pipe 56 with check valve 57, and also has an overflow connection 59 discharging back into the supply reservoir 25. The injector 54 takes steam from the boiler 15 through a valved connection 58 (Fig. II), which also extends up over the boiler 15 and down on the other side to the steam-siphon 28 (Fig. V).

Fuel oil is drawn (Figs. I, III and V) from a supply reservoir 16a under the cab floor 16 by a pump 60 driven by a constant speed (electric) motor 61, through suction connections 62 including a double fitting 63 in the top fuel-reservoir wall and parallel branches containing oil screens 64, 64. The fitting 63 also serves for a return connection 65 from a spring-controlled pressure-relief or by-pass valve 66 (Figs. I and V) connected to the delivery pipe connection 67 of said pump 60, leading to the burner 30. Boiler steam for atomizing is supplied the burner 30 (Figs. I, II, III and IV) through pipe connections 68, suitably valved and controlled; and air for the same purpose (before getting up steam) can be supplied to the pipe 68 through a valved connection from the pipe 52. Steam or air can also be admitted to the oil line 67 through a valved by-pass 70, for the purpose of blowing out residual oil when the boiler 15 is being shut down,—so as to prevent carbonization of such oil by the heat of the furnace and consequent fouling of the burner 30.

The supply of air for combustion is controlled by an upright butterfly damper 75 (Figs. I and VI) in the blower duct 33. The supply of fuel oil to the burner 30 is controlled by a rotary stop valve 77 in the pipe line 67, and the supply of steam for atomizing the fuel is controlled by a rotary stop valve 78 in the pipe line 68. All of these—damper 75 and valves 77 and 78—may be operated in unison by a common actuating lever 80 connected to their operating crank arms by link rods 81, 82, 83; and the lever 80 may be operated by a controller mechanism indicated at 85, included in the general control system hereinafter described. The controller 85 may preferably be arranged to change the air and fuel supplies from a maximum for "full flame" operation to give the maximum rated output of steam to a low or minimum value just about sufficient to maintain rated normal pressure in the boiler 15 when no steam is being taken from it, and vice-versa.

The supply of feedwater by the feed pump 45 is preferably controlled automatically according to the water level in the boiler and the demand on the boiler for steam. For this purpose, there is a level-responsive (Copes) regulator 86 (Figs. I, II, IV, VI, and VII) comprising a thermally responsive (inclined) tube 87 having its lower end connected to the water-space of the boiler 15 through a fitting 88 and suitably valved piping 89, and having its upper end connected to the steamspace of the boiler through a fitting 90 and suitably valved piping 91. The fitting 88 is mounted on the lower end of a rigid frame or casing 92, and is adjustable relative to the latter by means indicated at 93; and the fitting 90 is pivotally connected at 94 to one arm of an (angular) lever 95 fulcrumed at 96 on the upper end of the frame 92. The other arm of the lever 95 is connected by a link 97 to the operating arm of a throttle valve 98 interposed in the steam supply piping 51 of the pump 45. Thus the operation and speed of the pump 45 are controlled according to the waterlevel in the boiler 15 and the demand on the latter for steam: i. e., when the demand increases and the water-level falls, more of the length of the tube 87 is in contact with hot steam, so that the tube expands and opens the valve 98, increasing the speed of the pump 45 and the rate of feedwater supply to the boiler in proportion to the increased demand for steam,—and vice-versa.

As shown in Figs. I, IV, and VI, the water-space connection 89 of the regulator 86 is connected to one end of a horizontal equalizer tube 100 which extends and opens (through holes 101) into the center of the upright cylindrical boiler shell 19. This makes the action of the regulator 86 as nearly as possible responsive to the quantitative or real average waterlevel in the upright cylindrical shell of the boiler 15, without regard to slope of the free surface of the water as affected by rapid acceleration or retardation of the train, or by super-elevation of the track on curves, etc. In the present instance, the equalizer tube 100 extends diametrally across the boiler 15, so that water-gauges and/or try-cocks (not shown) may be connected to its other end, if desired, as indicated at 102 in Fig. I.

In case of failure of the regulator 86 to maintain an adequate waterlevel in the boiler 15,—as by getting out of order, or because of failure of the water-supply to the pump 45,—provision is made for shutting off fuel from the burner 30, by stopping the fuel pump motor 61. For this purpose, there is a low-water cutout device 104 (Figs. I, IV, and VI) comprising a float 105 in a chamber 106 connected to the piping 89 and 91 leading to the water and steam spaces of the boiler. When the waterlevel in the boiler 15 falls unduly, the fall of the float 105 opens a valve 107 (Fig. I) and thus admits pressure from the chamber 106 through a pipe connection 108 to an automatic pressure-actuated cutout switch 109 controlling the power circuit of the motor 61, thus stopping the pump 60. When rise of the waterlevel in the boiler 15 allows float 105 to close valve 107, pressure from the pipe 108 and the switch 109 is exhausted through a bleed-port 110 and a drain tube 111 (Figs. I and VI), allowing the power circuit to the fuel-pump motor 61 to be automatically restored.

For additional protection against low water in the boiler 15, there is shown in Figs. I, VI, VII, VIII, and IX an automatic cut-out switch 112 also controlling the power circuit of the fuel pump motor 61, arranged to be normally closed until opened by an adjustable abutment or tappet 113 on the lever 95. When expansion of the regulator tube 87 exceeds what may be considered a proper regulating range, however, the descent of the abutment 113 opens the switch 112, thus stopping the fuel pump 60. There is also shown in Fig. I a thermal switch device 115 responsive to the temperature in the boiler stack 42, controlling the power circuit of the fuel pump motor 61. This switch 115 is normally open until closed by rise of the stack temperature to a predetermined point. There is also a low-water alarm 116, consisting of electric bells and lights or the like, operated by closure of an automatic switch 117 in the alarm circuit. This switch 117 is closed by descent of an abutment fork or tappet 118 on the lever 95 against locknuts adjustable on the switch stem 119 when the regulator tube 87 expands beyond a proper limit, and opens when a proper waterlevel is restored.

There is also shown in Fig. I an automatic pressure-actuated switch 120 selectively controlling the operating circuits of the valve-controller 85, and connected by tubing 121 to the steamspace pipe connection 91. Another control over the operation of the system is a pressure switch 122 connected to the fuel oil pipe line 67 from the pump 60 to the burner 30, and normally open until closed by oil pressure due to the pump. In addition, there is an air relay 125 controlling the starting winding of the blower motor 34, and connected by a pipe 126 to the blower duct 33 leading to the boiler furnace. When pressure in the duct 33 falls, the relay 125 closes and causes energization of the starting winding, etc., of (induction) motor 34; but when the blower 32 speeds up, the resulting pressure in duct 33 opens the relay and causes the starting winding to be cut out, so that the motor 34 may run normally, single phase.

Referring, now, to the wiring diagram in Fig. X as well as to the general scheme of the apparatus in Fig. I, the system and its operation may be further described and explained as follows:

Alternating current at some 220 v. (from the locomotive transformer, trolley, or third rail) may be used to run the blower motor 34, while for the fuel pump motor 61 and the auxiliary and control circuits, direct current of low voltage (say 32) is preferred. For parts of the system where D. C. and A. C. circuits are in close proximity, the A. C. voltage may be stepped down to 24 v. (say) by means of a transformer. In Fig. X, the "main" circuits carrying A. C. at higher voltage are distinguished by the letter A, and those carrying A. C. at lower voltage by the letter a. As shown, a "blower switch" 130 serves to connect main circuit A including the blower motor 34 to the source of power at 220 volts A. C., and a transformer 131 serves to step down the voltage from circuit A to circuit a. Blower motor 34 is connected across circuit A, and also a circuit A1 including starting winding 132 of motor 34, starting resistor 133, and starting contactor 134. Circuit a includes the solenoid winding 136 of "high flame relay" with its double acting contactor 137, as well as fuel oil pressure switch 122, and is controlled by single acting contactor 138 of a double starting switch 139.

Assume that the boiler 15 is cold and the pressure therein low, and that all the circuits and apparatus are deenergized. In starting up the boiler, the first step is to close blower switch 130, thus starting motor 34 split phase. As motor 34 comes up to speed, the resulting air pressure opens "air relay" switch 125 in the control circuit A2 of starting contactor 134, thus opening contactor 134 and cutting out winding 132 and resistor 133, and so throwing the motor over to single phase induction running.

The next step is to close the "control switch" 140, thus connecting an "auxiliary" circuit c to the low voltage D. C. power supply. This circuit c includes magnet winding 141 of "pilot relay" switch 142, and is completed through "high flame relay" switch 137 and the circuits c1 and control contactor 143 of "valve controller" 144 as shown. This results in closing the "pilot relay" switch 142, without, however, closing any new circuits. Then the "fuel pump motor switch" 145 is closed, still without closing any new circuits or starting the pump motor 61,— since "fuel pump motor contactor" 146 is open.

The next operation is to move the "starting switch" 139 to "start, low flame" position, thus closing its double acting contactor 148 to shunt "stack control" thermal switch 115 through a circuit D and so complete a "control" or pilot circuit d that includes the magnet winding 149 of the "fuel pump motor contactor" 146,—and so close contactor 146. This closes and completes the power circuit e of the "fuel pump motor" 61, so that the pump 60 operates to supply fuel under pressure through pipe line 67, closing "fuel oil pressure switch" 122. The fire is then lighted at burner 30, and the boiler 15 starts to heat up. The "starting switch" 139 is kept "down" in "start, low flame" position until "stack control" switch 115 heats up and closes, thus short circuiting circuit D and establishing circuit d independently, whereupon switch 139 may be released and returned to its "run, low flame" position as shown in Fig. X, with contactor 148 bridging a different pair of contacts, and circuit D open. The system will then continue to run under low flame.

In order to allow of high flame operation, the "starting switch" 139 is thrown and latched up in "run, automatic" position, with its contactor 138 closed, thus closing circuit a through winding 136 of "high flame relay" 137, and thereby shifting the contactor at 137 to its other pair of contacts. This short circuits the circuits c1 of the "valve controller" 144, and establishes circuit c independently thereof. In addition, it closes an air and fuel control circuit f in shunt with a portion of circuit c, from "high flame relay" 137 through contactor 148, "pressure control" switch 120 (in "low pressure" position as shown), "valve controller" operating circuits f1, contactor 150, and "high flame field" 151 back to circuit c. This energizes field 151 and so operates the motor of "valve controller" 144 to throw the latter to high flame position, opening wide damper 75 and valves 77 and 78. It also opens contactors 143 and 150, thus breaking circuits c1 and f, f1 and deenergizing "high flame field" 151, and at the same time closes contactor 152 ready to energize "low flame field" 153 as hereinafter described. So long as "pressure control" switch 120 remains in "low pressure" position as shown, "valve controller" 144 remains deenergized in the position to which it has been thrown as above described, and the system operates in high flame.

When, however, the boiler pressure rises sufficiently to throw "pressure control" switch 120 to "high pressure" position, the circuit *f* is closed through the "valve controller" operating circuits *f2*, contactor 152, and "low flame field" 153, thus energizing the latter and operating the motor of the "valve controller" 144 to throw the latter back to the low flame position shown, correspondingly closing damper 75 and valves 77 and 78 and thus returning the system to low flame operation. This continues until the boiler pressure drops sufficiently to return the "pressure control" switch 120 to "low pressure" position, when the "valve controller" motor is operated as before to change the system to high flame operation,—and so on indefinitely as the boiler pressure fluctuates.

The operation of the various alarm and safety devices will be evident from the description already given, but may be briefly explained as follows:

If the water level in the boiler 15 falls too low, the regulator 86 will close the contacts 117 and the alarm circuit *g* to operate the buzzers and light the lamps of the alarm 116, and will also open the "low water cut-out" 112 in the circuit *d*, thus deenergizing this circuit and causing the "fuel pump motor contactor" 146 to open the fuel pump power circuit *e* and stop the pump 60, and the "pilot relay" 142 to open the circuit *c*. Stoppage of fuel pump 60 will cause the "fuel oil pressure switch" 122 to open, breaking the circuit *a* and causing the "high flame relay" contactor at 137 to return to the position shown in Fig X. Eventually, also, the "stack control" switch 115 will open. Or, if the "low water cut-out" 112 fails to act, the auxiliary float device 104 will open the "auxiliary low water cut-out" 109 with exactly the same effect. Or if the fire goes out for any reason, the absence of heat in the stack 42 will cause the "stack control" switch 115 to open with the same effect. Failure of the D. C. current supply to the switches 140, 145 will have the same effect as opening of one of the cut-outs 109, 112, 115.

On occasion (as on failure of current from the overhead trolley system), the regulatory mechanism can be operated by hand. For this purpose, the fulcrum pin 155 of the lever 80 (Fig. I) can be removed, and the lever 80 operated by hand according to the varying requirements for fuel and air. In this case, a draft may be created and maintained at the stack 42 by means of one or more exhaust and live steam and/or air jets 156, 157, supplied through valved pipe connections 158, 159 from the exhaust of the boiler feed pump 45 and from the boiler 15, Figs. II and IV. As shown, the live steam pipe 159 has a suitably valved connection 160 to the compressed air supply pipe 52.

Having thus described my invention, I claim:

1. The combination with a boiler of a safety device therefor responsive to the water level at the center of said boiler, and thus unaffected by variation in slope of the free surface of the liquid in the boiler.

2. The combination with an upright cylindrical boiler of a water-level responsive safety device therefor, and a water connection between said device and the boiler opening into the latter substantially at its vertical axis, so that said safety device shall respond truly to the quantity of water in the boiler, substantially unaffected by variation in slope of the free surface of the liquid in the boiler.

3. The combination with a boiler and means for supplying operating fluid thereto, of water-level responsive means for controlling said operating fluid supplying means, and a water connection from said level-responsive means opening into the boiler substantially at its center, so that the operating fluid shall be controlled by the quantity of water in the boiler substantially unaffected by variation in slope of the free surface of the liquid in the boiler.

4. The combination with an upright cylindrical boiler and means for supplying operating fluid thereto, of water-level responsive means for controlling said operating fluid supplying means, and a water connection from said level-responsive means opening into the boiler substantially at its center and at a level approaching an operating supply of water in the boiler, so that said water-level responsive means shall respond directly to the level of water at the center of the boiler, substantially unaffected by variation in slope of the free surface of the water.

5. The combination with a boiler, means for supplying fuel to heat the boiler and for supplying energy to operate said fuel-supplying means, of circuits for controlling the supply of energy to operate said fuel-supplying means and for supplying energy to the control circuit, electrically operated means for varying the supply of fuel by the aforesaid fuel supplying means, a circuit controlling the supply of energy to said fuel supply-varying means, and means responsive to the boiler pressure for controlling and reversing the action of said fuel supply-varying means.

6. The combination with a boiler, means for supplying fuel to heat the boiler, and for supplying energy to operate said fuel-supplying means, and electrically driven means for supplying air for combustion of the fuel, of a circuit for supplying current to drive said air-supplying means, electrically operated means for varying the supplies of air and fuel by the aforesaid air and fuel supplying means, and means responsive to the boiler pressure for controlling and reversing the action of said air and fuel supply-varying means.

7. The combination with a boiler, means for supplying fuel to heat the boiler, and for supplying energy to operate said fuel-supplying means, and electrically driven means for supplying air for combustion of the fuel, of electrically operated means for varying the supply of fuel by the aforesaid fuel supplying means, a circuit energized from said circuit that supplies current to drive said air-supplying means and controlling the supply of energy to said fuel supply-varying means, and means responsive to the boiler pressure for controlling and reversing the action of said fuel supply-varying means.

8. The combination with a boiler, means for supplying fuel to heat the boiler, and for supplying energy to operate said fuel-supplying means, circuits for controlling the supply of energy to operate said fuel-supplying means and for supplying energy to the control circuit, electrically operated means for varying the supply of fuel by the aforesaid fuel supplying means, means responsive to the boiler pressure for controlling and reversing the action of said fuel supply-varying means, means for initially closing said control circuit, and means responsive to the heat of the fire for short-circuiting said last-named means and thus maintaining the control circuit closed regardless thereof.

9. The combination with a boiler, means for supplying fuel to heat the boiler, and for supplying energy to operate said fuel-supplying means, circuits for controlling the supply of energy to operate said fuel-supplying means and for supplying energy to the control circuit, electrically operated means for varying the supply of fuel by the aforesaid fuel supplying means, a circuit controlling the supply of energy to said fuel supply-varying means, closing and opening means in said last-mentioned circuit responsive to pressure of the fuel supply, and means responsive to the boiler pressure for controlling and reversing the action of said fuel supply-varying means.

10. The combination with a boiler, means for supplying fuel to heat the boiler, and for supplying energy to operate said fuel-supplying means, circuits for controlling the supply of energy to operate said fuel-supplying means and for supplying energy to the control circuit, electrically operated means for varying the supply of fuel by the aforesaid fuel supplying means, a circuit controlling the supply of energy to said fuel supply-varying means, closing and opening means in said last-mentioned circuit responsive to pressure of the fuel supply, means for closing or opening said circuit when said last-mentioned means is closed, means responsive to the boiler pressure for controlling and reversing the action of said fuel supply-varying means, means for initially closing said control circuit, and means responsive to the heat of the fire for short-circuiting said last-named means and thus maintaining the control circuit closed regardless thereof.

11. The combination with a boiler, means for supplying and regulating fuel to heat the boiler and air for combustion of the fuel, and circuits for supplying energy to operate said fuel-supplying and air-supplying means, of a motor-control circuit including means for controlling energization of said motor supply circuit, and automatic cut-out means, with means for temporarily energizing said circuit at starting regardless of said cut-out means; an auxiliary circuit including means for controlling energization of said control circuit; an air and fuel control circuit including actuating means for the aforesaid fuel and air-regulating means; a circuit, whose energization is controlled by that of the air-supply means circuit, including means for controlling energization of said air and fuel control circuit; means responsive to the action of the fuel-supply means for controlling the last-mentioned circuit; and means responsive to the boiler pressure for controlling the action of the aforesaid actuating means.

12. The combination with a boiler, means for supplying fuel to heat the boiler, and for supplying energy to operate said fuel-supplying means, and electrically driven means for supplying air for combustion of the fuel, of a circuit for supplying current to drive said air-supplying means, circuits for controlling the supply of energy to operate said fuel-supplying means and for supplying energy to the control circuit, electrically operated means for varying the supplies of air and fuel by the aforesaid air and fuel supplying means, a circuit energized from said circuit that supplies current to drive said air-supplying means and controlling the supply of energy to said air and fuel supply-varying means, and means responsive to the boiler pressure for controlling and reversing the action of said air and fuel supply-varying means.

13. The combination with a boiler, means for supplying fuel to heat the boiler, and for supplying energy to operate said fuel-supplying means, and electrically driven means for supplying air for combustion of the fuel, of a circuit for supplying current to drive said air-supplying means, circuits for controlling the supply of energy to operate said fuel-supplying means and for supplying energy to the control circuit, electrically operated means for varying the supplies of air and fuel by the aforesaid air and fuel supplying means, a circuit energized from said circuit that supplies current to drive said air-supplying means and controlling the supply of energy to said air and fuel supply-varying means, means responsive to the boiler pressure for controlling and reversing the action of said air and fuel supply-varying means, means for initially closing said control circuit, and means responsive to the heat of the fire for short-circuiting said last-named means and thus maintaining the control circuit closed regardless thereof.

14. The combination with a boiler, means for supplying fuel to heat the boiler, and for supplying energy to operate said fuel-supplying means, and electrically driven means for supplying air for combustion of the fuel, of a circuit for supplying current to drive said air-supplying means, circuits for controlling the supply of energy to operate said fuel-supplying means and for supplying energy to the control circuit, electrically operated means for varying the supplies of air and fuel by the aforesaid air and fuel supplying means, a circuit energized from said circuit that supplies current to drive said air-supplying means and controlling the supply of energy to said air and fuel supply-varying means, closing and opening means in said last-mentioned circuit responsive to pressure of the fuel supply, and means responsive to the boiler pressure for controlling and reversing the action of said air and fuel supply-varying means.

15. The combination with a boiler, means for supplying fuel to heat the boiler, and for supplying energy to operate said fuel-supplying means, and electrically driven means for supplying air for combustion of the fuel, of a circuit for supplying current to drive said air-supplying means, circuits for controlling the supply of energy to operate said fuel-supplying means and for supplying energy to the control circuit, electrically operated means for varying the supplies of air and fuel by the aforesaid air and fuel supplying means, a circuit energized from said circuit that supplies current to drive said air-supplying means and controlling the supply of energy to said air and fuel supply-varying means, closing and opening means in said last-mentioned circuit responsive to pressure of the fuel supply, means for closing or opening said circuit when said last-mentioned means is closed, means responsive to the boiler pressure for controlling and reversing the action of said air and fuel supply-varying means, means for initially closing said control circuit, and means responsive to the heat of the fire for short-circuiting said last-named means and thus maintaining the control circuit closed regardless thereof.

16. A boiler and furnace control system comprising a main circuit including a blower motor with its starting means; a circuit energized from said main circuit and including a control switch, a fuel oil pressure switch, and a contactor relay;

an auxiliary circuit including a pilot relay, a double contactor operated by the aforesaid contactor relay, and a control contactor; a control circuit energized from said auxiliary circuit and including a contactor operated by said pilot relay, a pump control relay, automatic cut-out devices, and a starting switch in shunt to one of said cut-out devices; a fuel pump circuit energized from said auxiliary circuit, and including a contactor operated by said fuel pump control relay and a fuel pump motor; and a fuel and air control circuit energized from said auxiliary circuit, controlled by said double contactor and including a reversible fuel and air supply motor operating said control contactor and provided with oppositely acting operating circuits and with means for opening and closing them on its opposite movements, and also including means responsive to boiler pressure for selectively controlling energization of said motor operating circuits.

ROBERT N. MILLER.